Aug. 21, 1962   C. D. WILLSON   3,050,330
STAGGERED TWO-STORY HOUSE TRAILERS
Filed Sept. 19, 1958   2 Sheets-Sheet 2
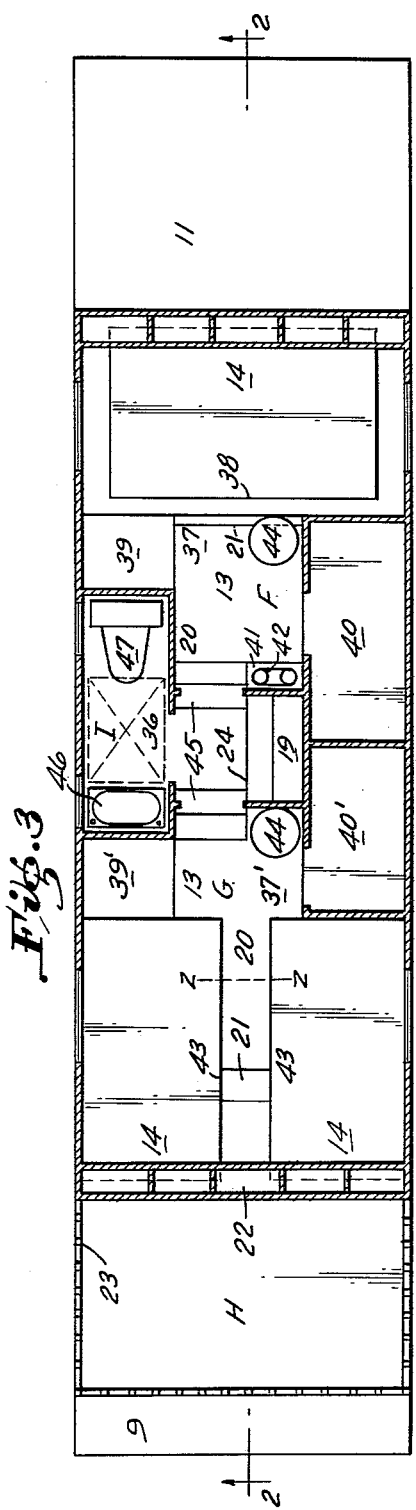
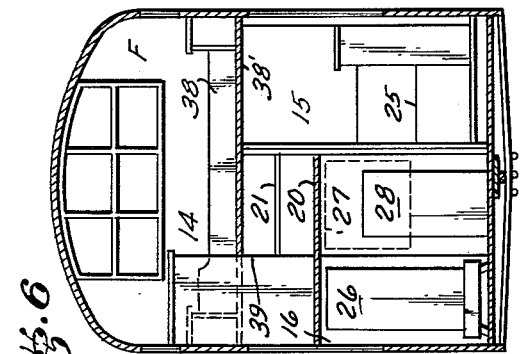
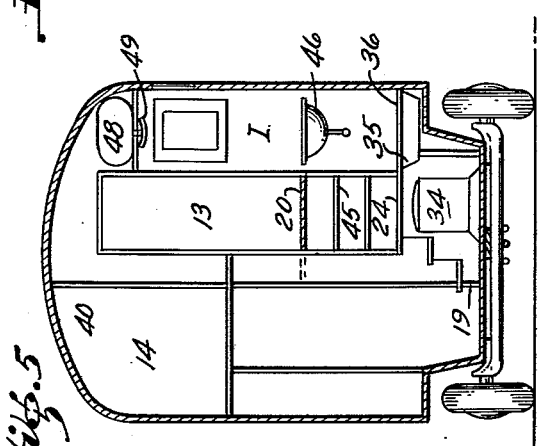
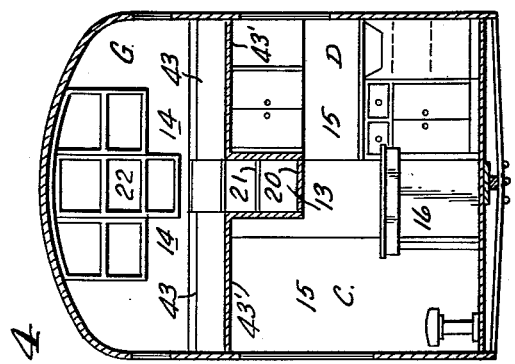
Inventor
Corwin D Willson

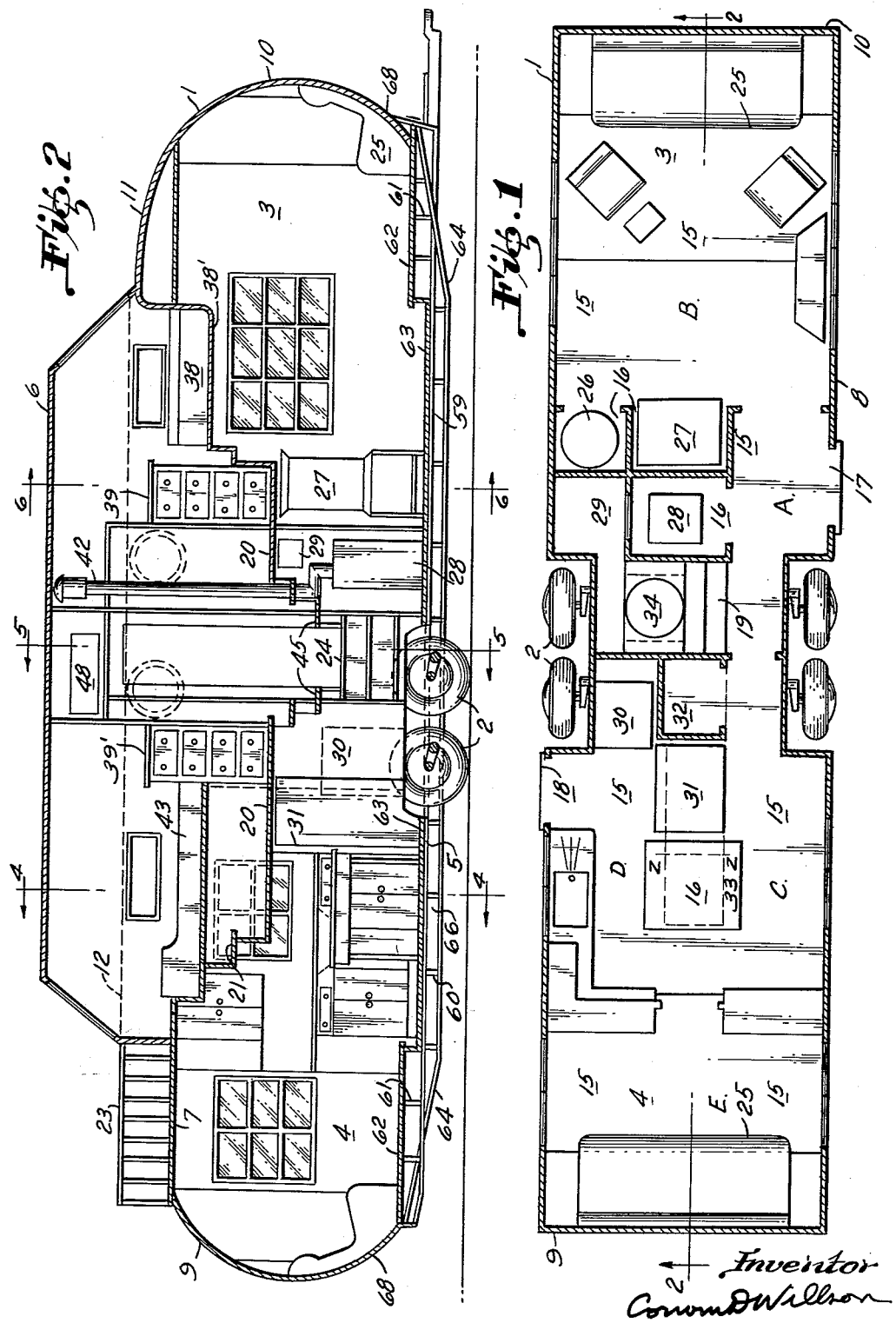

United States Patent Office 3,050,330
Patented Aug. 21, 1962

3,050,330
STAGGERED TWO-STORY HOUSE TRAILERS
Corwin D. Willson, 525 Golden Gate St.,
Lake Orion, Mich.
Filed Sept. 19, 1958, Ser. No. 762,016
15 Claims. (Cl. 296—23)

This invention relates to habitable road vehicles and, more particularly, to mobile dwellings in staggered two-story bodies of house trailer type, some intended to have fixed ground support at the dwelling site. Since many of the figures of the drawings are identical with those of co-pending application Ser. No. 551,243 filed December 6, 1955, and now abandoned, this application constitutes a continuation in part of that application which will be referred to herein as the "parent" application which relates to trailer type dwellings analogous to those shown in Patents Nos. 2,743,955 and 2,577,836 which latter was a division of abandoned application Ser. No. 437,708 filed April 4, 1942.

As many states have now begun to permit the special conveyance of trailer bodies ten feet wide on their highways whereas the parent application described bodies having the eight foot maximum width legal for common transit, it will be understood that house trailers made according to this invention may take advantage of this legislation to exceed a maximum size legal for the common everyday transit of ordinary road vehicles, such as trucks and busses.

The primary object of this invention is a new combination of the body components of a staggered two-story road vehicle: this new combination to achieve a more novel and far more useful mobile dwelling structure than is found in prior art.

Another object of the invention is a staggered two-story house trailer body ballasted to lower the center of gravity of the body, the ballast consisting of numerous heavy housekeeping facilities concentrated next to the bottom of the body.

Another object of the invention is an entrance vestibule from which private passage to as many as five habitable compartments is possible without having to pass through any one of the compartments to reach the others from the vestibule.

Another object of the invention is a chamber having a walkway between a pair of bed platforms in said chamber, and partitions walling opposite sides of the walkway below the platforms to separate staggered upper story and lower story body portions of full standing height.

Another object of the invention is a vehicular structure adaptable to meet the requirements of a number of quite different kinds of dwellings which include: the seldom mobile house trailer too large for common highway transit, the travel trailer intended for frequent mobility, and the automotive land cruiser.

These and other novel features and objects of the invention are hereinafter more fully described and claimed and the preferred form of my staggered two-story body structure is shown in the accompanying drawings, in which:

FIG. 1 is a lower-story floor plan of the two-story body of the parent application.

FIG. 2 is in part a longitudinal section on line 2—2 of FIG. 1, which line similarly indicated in other of the drawings is the longitudinal center line of the body—the lengthwise center axis.

FIG. 3 is a floor plan of the upper story, including the bathroom of intermediate level between lower and upper stories of the two-story body.

FIG. 4 is in part a transverse section of the body taken on line 4—4 of FIG. 2 showing the upper-story walkway between the twin-bed platforms.

FIG. 5 is in part a transverse section on line 5—5 of FIG. 2 which line is the transverse center axis of the body.

FIG. 6 is in part a transverse section on line 6—6 of FIG. 2.

The preferred form of my two-story habitable body has a rigid body 1 suspended on pairs of roadwheels 2, hitched tandem. Opposite end-lengths 3 and 4 of the body are one-storied and have greater road clearance than the connecting mid-length of the body, mid-length 5 having a top 6 that is upwardly bowed crosswise of the body above flat roof 7 of rear end-length 4. Mid-length 5 has the maximum width legal of common passage on the highway as a road vehicle and a height barely clearing overhead obstacles. Haulaway loads of new motorcars will just clear a 13½ foot underpass and the trend in highway design is presently to standardize road clearance above 13 feet, although some backward states still retain overhead obstacles that are only 12 feet above the roadbed. But as road clearances everywhere increase, more generous story heights will be possible in the two-story lengths of the bodies to be described, the basic structure remaining the same. Since the story height in fixed houses averages above eight feet, it is apparent that it is not possible to convey a portable dwelling of two stories over the public highway except as the body structure meets the limitations of highway transit. In FIGS. 1–6, this problem is met by dividing the two-story length of the body in a particular manner that tends to lower the center of gravity of the body. Mid-length 5 contains the "core" of the dwelling appurtenances. Its manufacture may thus be highly standardized in models ranging widely in length, the variables being concentrated in the simpler single-story end-lengths 3 and 4 of the longer models, the living lounge, for example, being made much longer without effecting the structure of mid-length 5.

Opposite side walls 8 of body 1 may be rectilinear in a vertical plane through opposite sills to the eaves line and a horizontal section through any level of rear end wall 9 and front-end wall 10 shows end walls and side walls meeting at right angles. Transverse vertical sections through end-length roofs 7 and 11 are rectilinear, while a vertical section crosswise of roof 6 of midlength 5 is curvilinear (in FIGS. 4, 5 and 6, ovular) to keep the body at the eaves line 12 only slightly higher above the ground level than the eaves line of an ordinary one-story trailer. This low eaves line and consequent lowered center of gravity is not possible where, as in prior art, the upper story walkway extends along one side of the body which compels maximum body height along one side of the body making a symmetrical design difficult. The fact that eaves line 12 is under 9½ feet above road level testifies to the problem of high center of gravity—dangerous in passage over uneven ground—having been successfully coped with by the invention.

Further to lower the center of gravity, mid-length 5 is interiorly divided so that upper levels have body portions 13 of full standing height and other body portions 14 of less than standing height extending above body portions 15 of full standing height and body portions 16 of less than standing height. And it is one of the novelties of the invention that body portions 14 and 16 of less than standing height have been made as useful in family habitation as body portions 13 and 15 of full standing height. Many housekeeping facilities normally are of less than standing height and much of the space in fixed houses over beds, tables, cookstove, refrigerator, television set, dressers and the like, is wasted. Part of the inventive ingenuity of my habitable vehicle structure resides in placing such housekeeping facilities in body portions of less than standing height where they are directly accessible from contiguous body portions of full standing height.

The center of gravity is further lowered by concentrating the heavier of these facilities in the body portions of less than standing height of lowest level.

As seen in FIG. 1, the lower story comprises hall A entered from main entrance door 17 in the right-hand side of the body looking forward, the side that is parked next to the curb. Hall or vestibule A permits private direct passage from out-of-doors to the upper story compartments or chambers without entering any of the other compartments. Off hall A is main lounge or living room B. Dining room or dining space C is also directly off hall A and from dining room C there are direct passages to kitchen D having service door 18 in side 8 of body 1 and to bedroom, maid's room or den E. Stairs 19 lead up to walkway 20 in compartments of upper level. As used herein, the term "compartment" will be understood to mean an enclosure of house trailer room size wherein a human adult may cook, eat, sit, lie or walk about erect even where the compartment contains some portions of less than standing height adequate to receive housekeeping facilities directly laterally accessible from body portions of full standing height. In bedroom F and bedroom G steps and risers of stairs 21 lead from walkway 20 up to opening closure 22 to roof deck or open porch H enclosed by railing 23. Walkway 20 is bottomed in part by stairs 19 having landing 24 off which is toilet and bath I intermediate between lower and upper stories. In a body length of only 34 feet—but variable from 28–48 feet—body 1 offers essentials for individual privacy in group habitation normally found only in a multi-bedroom fixed house. The description makes it apparent that a dwelling occupant, leaving means of horizontal repose in apartments B, E, F and G, may pass privately to bath I or by way of vestibule A and door 17 leave body 1 without invading the privacy of other apartment occupants. Compartments F and G will be referred to herein as "upper compartments" and since compartment I is only a few risers up from compartments B and C, it, along with compartments A, B, C, D and E will be referred to herein as "lower compartments." Where apartment E is used for two children, the davenport shown in the drawings may be replaced with a double-deck bunk bed.

In FIG. 1, hot water storage tank 26 is in a body portion 16 next to bathroom I and television set 27 is in a body portion 16 facing davenport 25. Off hall A, space heater 28 in a body portion 16 directly heats bathroom I by way of body portion 16 and register 29. In kitchen D, cookstove 30 and cold-food storage cabinet or refrigerator 31 are in body portions 16 and in dining room C, storage or wrap closet 32 and dining table 33, equally accessible from kitchen D, occupy body portions 16. Tank 34 is under landing 24 and bathing receptacle 35 is under movable panel 36 of floor in bathroom I.

In bedroom F, walkway 20 has floor 37 bottoming a body portion 13 of full standing height, floor 37 extending alongside and below double bed platform 38 lengthwise thereof and between dresser or chest of drawers 39 and storage closet 40, side of bed 38 including tread 21 constituting a partition extending down from bed platform 38' to floor 37 between staggered upper story body portion 13 of full standing height and lower story body portion 15 of full standing height, the underside of bed platform 38' providing the ceiling of the lower story. In enclosed space 41, smoke pipe 42 from space heater 28 rises through roof 6. In rear bedroom G twin beds 43 extend lengthwise on opposite sides of, and well above walkway 20 which extends in and on opposite sides of the longitudinal center axis of the body. Floor 37' in chamber G gives access to walkway 20 and stairs 21 and extends between storage closet 40' and dresser or chest of drawers 39'. Legged chairs 44 rest on floors 37 and 37' in upper compartments G and F from which upper lengths 45 of stairs 19 lead down to landing 24. Stairs 21 may be considered part of walkway 20. In FIG. 2, it will be noted that ceiling of compartment E extends into compartments C and D and this ceiling 7 together with top of stairs 21 provides full standing height that extends on opposite sides and around one end of walkway 20 in compartments C and D. In compartment or chamber G, bed platforms 43' and top of stairs 21 and ceiling 7 together bottom an upper story body portion 14 of less than standing height that is walled by opposite exterior sidewalls of the body shell and by one transverse upper endwall of the body shell and in chamber G this body portion of less than standing height borders opposite sides and one end of walkway 20. Steps and risers 45, and landing 24 are integral parts of stairway 19 which, in turn, is part of a walled passage apart from but opening into compartments B, C, F, G and I, and vestibule A may be considered an enlarged part of this passageway. In bathroom I are lavatory 46, stool 47 and bathing receptacle 35 accessible under panel 36. In FIG. 5, water storage tank 48 with attached shower head 49 may also be attached by pipes to the lavatory, toilet stool and kitchen sink so that all plumbing fixtures may be used in transit under gravity flow from tank 48.

Since lower compartments C and D are separated only where walkway 20 projects downwardly below the spaced ceiling areas 43' that make up the undersides of legless bunk beds 43 or platforms 43', the pair of compartments C and D may be considered one compartment in a housekeeping suite of compartments. Where it is desired to substitute a bedroom of the F type for bedroom G, a double bed platform 38' may take the place of the spaced bed platforms 43'. Without walkway 20 giving access to flat rooftop 7 the rear end of the body may be given a topside like roof 11 in reverse and the ceiling height of den E may be correspondingly increased. The changes this involves in the lower compartments are not shown except to indicate that walkway 20 of floor 37' will not then extend rearward beyond line z—z in FIGS. 1 and 3.

As seen in FIGS. 2 and 4, the body bottom is trussed to have metallic compression member 59 along or let into the tops of cross-member floor supports 60 spaced in midlength 5 as well as along or into the bottoms of cross-member floor supports 61 in end-lengths 3 and 4 of body or body shell 1. The top-sides of floors 62 may be as much as a full riser above the topside of main floor 63 and for purposes of easy description, this bottom structure is called "swaybacked." Advantage is taken of this means of increasing ground clearance under opposite end-lengths of the body to utilize tension elements or rods 64 on opposite sides of compression member 59, rods 64 running under mid-length 5 and abruptly upwardly inclined under end-lengths 3 and 4. Opposite ends of tension or truss rods 64 are caught through opposite end body cross members. Short compression spacers 66 extend between the vertical sides of cross members 60 and 61. When all parts of the body bottom are thus assembled, truss rods 64 are tensioned as by turn-buckles against the compressive resistance of body-long compression member 59 and spacers 66 and the bracing resistance of forward and rearward body bulges 68. By this means great stiffness is secured in a body bottom having a minimal floor depth, minimal weight and a simple framing plan. The center of gravity is accordingly lowered and the mainfloor top may extend close to the level of the axes of the roadwheels, yet adequate road clearance is provided under opposite ends of the body.

From this description, it is apparent that the structure achieves a novel and much more commodious and houselike mobile dwelling structure than I have anywhere previously publicly described or than is to be found in any other prior art known to me.

The drawings, being illustrative only, are more or less diagrammatic in character to show the preferred relation of the parts to the whole, and it is to be observed that changes may be made in various parts without vitally altering the character of the whole or departing from the spirit and scope of the invention as set forth in the appended claims, and it will be understood that any of the variants and modifications in the structure of my staggered two-story vehicular dwellings, whether these be travel trailers, mobile homes exceeding a dimension maximal for common road vehicles in everyday highway transit, or automotive land cruisers, may be used separately or in any desired combination and that all changes which come within the meaning and range of equivalency of the claims are therefore intended to be embraced therein.

Having thus broadly defined and fully described my invention, its greatly improved structure and greater utility, what I claim and desire to secure by Letters Patent of the United States is:

1. For highway transit, a housekeeping apartment encased on all sides by the outer shell of a two-story road vehicle body that is higher than wide, said apartment comprising a suite of dwelling compartments, the largest for the assembly of body occupants walled around opposite sides by said shell, a second of the compartments housing means of cookery, a third compartment giving access to several sanitary plumbing receptacles; the interior structure of the body combining means dividing the body into upper and lower story body portions of full standing height and into other body portions of less than standing height, said dividing means including in a fourth of said compartments a bed platform above the center of gravity of the body, and a partition and a floor, said partition below and lengthwise of said platform extending from said platform down to said floor between a staggered pair of said upper and lower story body portions of full standing height, a passageway in said suite connecting a door of said third compartment with said fourth compartment privately from said largest compartment, and means lowering said center of gravity to ensure greater body stability in passage over uneven ground comprising concentrating in said body portions of less than standing height next to the shell bottom body ballast in the form of metallic housekeeping facilities of only partial story height: refrigerator, space heater, cookstove, water-storage tank, television set, all directly accessible from lower story body portions of full standing height and providing body stabilizing concentration of ballast below said center of gravity.

2. For highway transit, a housekeeping apartment encased on all sides by the outer shell of a two-story road vehicle body, said apartment comprising a passageway and a suite of specialized dwelling compartments: a first having opposite sides and bottom walled by said shell to house the assembly and diversion of the body occupants, a second of the compartments housing means of utensil storage and cookery, a third compartment housing sanitary plumbing receptacles, a fourth compartment having most of the area of opposite sides and top walled by said shell and housing fixed means of in-bed repose, said passageway outside said first and second compartments extending from a door of said third compartment to a door into said fourth compartment and the interior structure of the body combining means dividing the body into upper and lower story body portions of full standing height and into other body portions of less than standing height: said dividing means combining in said fourth compartment a bed platform, two partitions extending only below said platform, and a floor, said partitions meeting to form a corner below the conjunction of one side and one end of said platform, and said partitions extending from said side and end of said platform down to said floor between a staggered pair of said upper and lower story body portions of full standing height, said floor wholly in said fourth compartment extending around said corner to ease making up a bed on a mattress supported by said platform.

3. The structure of claim 2 wherein said passageway opens into a fifth of said compartments comprising an entrance hall having a door in one side of said shell, and said floor tops one of said body portions of less than standing height housing a space-heater and passing heated air directly into said third and fifth compartments.

4. For highway transit, a housekeeping apartment encased on all sides by the outer shell of a two-story road vehicle body, said apartment comprising a pasageway and a group of specialized dwelling compartments, the largest having opposite sides and bottom walled by said shell to house the assembly of body occupants, a second of the compartments housing means of dishwashing and cookery, a third housing means of personal sanitation, a fourth housing dual and separate means of in-bed repose and said passageway outside said first and second compartment extending from a door of said third compartment to a door into said fourth compartment; the interior structure of said body combining means dividing the body into staggered upper and lower story body portions of full standing height and into other body portions of less than standing height, said dividing means including in said fourth compartment a floor, two bed platforms and two partitions extending in substantially parallel relation below and lengthwise of said platforms from said platforms down to said floor to wall opposite sides of a walkway between the long sides of said platforms and between one of said upper story body portions of full standing height and two of said staggered lower story body portions of full standing height.

5. The structure of claim 4 wherein said walkway tops one of said body portions of less than standing height housing a dining table accessible in said second compartment and having three sides extending in body portions of full standing height.

6. A two-story house trailer body having an outer shell that may exceed a dimension maximal for common road vehicles, the shell housing a side entrance vestibule that is part of a lower hallway between and opening into two lower housekeeping compartments, and an upper chamber having a bed platform at the bottom of a body portion of less than standing height walled by a transverse upper endwall of the shell, a floor in the chamber giving access to the platform, a partition extending down from the platform to the floor between staggered upper and lower body portions of full standing height, a lower enclosure of less than standing height topped by said floor, and a stairway ascending from said hallway to said upper chamber against two sides of the lower enclosure.

7. A two story vehicular body having a bed platform in an upper compartment, the platform being wholly on one side of the longitudinal center axis of the body, and a floor extending alongside, below and giving access to the platform, and a partition extending down from the platform to the floor between staggered upper and lower body portions of full standing height, and upper and lower story body portions of less than standing height, the upper being above said platform and the lower being below said floor.

8. A two-story house trailer body having an outer shell that may exceed a dimension maximal for common road vehicles in everyday highway transit, the shell enclosing a housekeeping suite of not less than one upper compartment and two lower compartments and a walled passage opening into each of the three compartments; the upper compartment having a body portion of less than standing height walled by a transverse upper endwall of the shell and bordering opposite sides and one end of a walkway extending in the compartment down below spaced ceiling areas topping lower story body portions of full standing height, a bed platform in the upper compartment accessible from the walkway and bottomed by one of said ceiling areas, and partitions extending down from the spaced ceiling areas to wall opposite sides of the walkway.

9. A two-story house trailer body having an outer shell that may exceed a dimension maximal for common road vehicles in everyday highway transit, the shell enclosing a housekeeping suite of not less than one upper compartment and two lower compartments and a walled passage opening into each of the three compartments; the upper compartment having body portions of less than standing height walled by opposite sidewalls of the shell and bottomed by bed platforms along opposite sides of a walkway in the compartment and partitions extending down from the platforms to wall opposite sides of the walkway between three staggered body portions of full standing height: one being topped by the shell above said walkway and the other two being topped by said platforms.

10. A two-story house trailer body having an outer shell that may exceed a dimension maximal for common road vehicles in everyday highway transit, the shell enclosing a housekeeping suite of not less than two upper compartments separated one from the other in the longitudinal center axis of the body by a stairwell, the two spaced compartments walled by opposite upper endwalls of the shell and having floors and bed platforms alongside and above the floors and partitions extending down from the platforms to the floors between staggered upper and lower body portions of full standing height, two lower enclosures of less than standing height topped by said floors, and said stairwell extending between the two enclosures.

11. A two-story house trailer body having an outer shell that may exceed a dimension maximal for common road vehicles in everyday highway transit, the shell enclosing a housekeeping suite of one upper compartment and two lower compartments and a walled passage opening into each of the two lower compartments and ascending to the upper compartment which is walled by a transverse upper end wall of the shell and has a bed platform and a floor extending in the compartment around a corner made by the meeting of partitions extending down from two contiguous sides of the platform to the floor between staggered upper and lower body portions of full standing height.

12. A two-story house trailer body having an outer shell that may exceed a dimension maximal for common road vehicles in everyday highway transit, the shell enclosing a housekeeping suite of not less than one upper compartment and two lower compartments and a walled passage opening into each of the three compartments; the upper compartment substantially above and alongside a floor therein having a body portion of less than standing height walled by opposite sidewalls and an upper endwall of the shell and bottomed by a bed platform, said floor giving access to a dresser next to one side of the shell and to a storage enclosure next to the opposite side of the shell, and a partition extending down from the platform to the floor between staggered upper and lower body portions of full standing height, the upper being above said floor and the lower being below said platform.

13. A two-story trailer body having an outer shell that may exceed a dimension maximal for common road vehicles in everyday highway transit and that combines two-story and one-story body lengths to enclose a housekeeping suite of one upper compartment and three lower compartments and a passage between two of the lower compartments ascending to the upper compartment; one of the lower compartments enclosed by said one-story length having a rather flat topside and said upper compartment walled by a transverse upper end wall of the shell that extends up from and makes approximately a right angle with said topside and the upper compartment having a bed platform and a floor and a partition extending down from the platform to the floor between staggered upper and lower body portions of full standing height, an opening closure in said endwall, and steps leading from said floor up to said opening closure.

14. A two-story trailer body having an outer shell that may exceed a dimension maximal for common road vehicles in everyday highway transit, the shell enclosing a housekeeping suite of one upper compartment and a pair of lower compartments opening into each other and a passage descending from the upper compartment and opening into one compartment of said pair; means partially separating one compartment of said pair from the other thereof comprising a walkway in the upper compartment extending down below and between spaced ceiling areas of said pair, the upper compartment walled by a transverse upper endwall of the shell and having a bed platform bottomed by one of the ceiling areas, partitions extending down from said ceiling areas to wall opposite sides of the walkway, the spaced ceiling areas merging around one end of the walkway to top a lower body portion of full standing height walled by opposite sidewalls of the shell, and a lower body portion of less than standing height topped by said walkway and standing open between said pair.

15. In a two-story vehicle body having a rigid outer shell, a legless bunk bed accessibly alongside and well above a floor in an upper chamber of the body, the bed being at the top of a partition that extends down to the floor between staggered body portions of full standing height, and the bed being at the bottom of a body portion of less than standing height that is confined within said chamber and walled around three sides by, and exposed directly to, opposite sidewalls and one transverse upper endwall of said shell.

References Cited in the file of this patent

UNITED STATES PATENTS

| | | |
|---|---|---|
| 1,580,661 | Funk et al. | Apr. 13, 1926 |
| 1,798,542 | Koch et al. | Mar. 31, 1931 |
| 2,577,836 | Willson | Dec. 11, 1951 |
| 2,589,894 | Ten Eyck | Mar. 18, 1952 |
| 2,743,955 | Willson | May 1, 1956 |

OTHER REFERENCES

Article: "Two-Storey Statesman" in "The Autocar" Magazine, Sept. 14, 1951, page 1098.

Article: "Trailer Coach Industry Becomes of Age" in "Automotive Industries," Aug. 1, 1953, page 52.

Article: "Structural Mobility" in "The Architectural Record," July 1936, pages 64–65.